Figure 1:
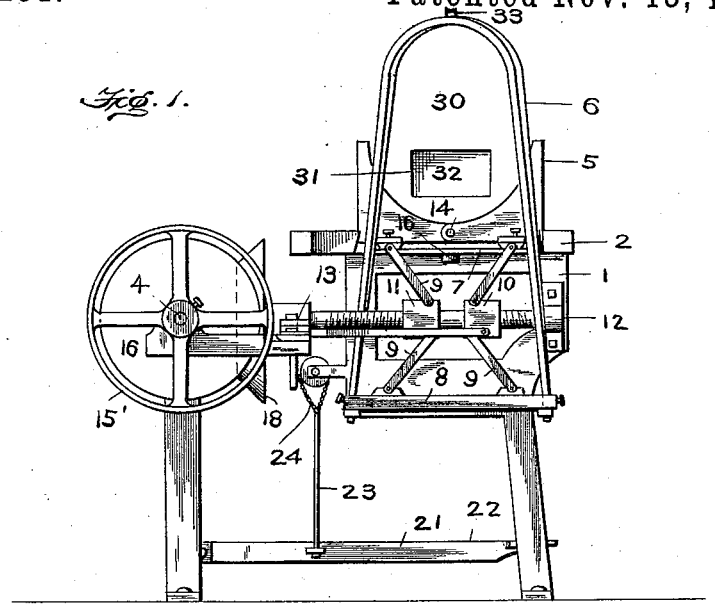

(No Model.) 2 Sheets—Sheet 1.

D. S. ABBOTT & G. G. PARKER.
MACHINE FOR BUNDLING KINDLING WOOD.

No. 529,231. Patented Nov. 13, 1894.

Witnesses:

David S. Abbott.
George G. Parker.
Inventors:

By Edson Bro's
Att'ys.

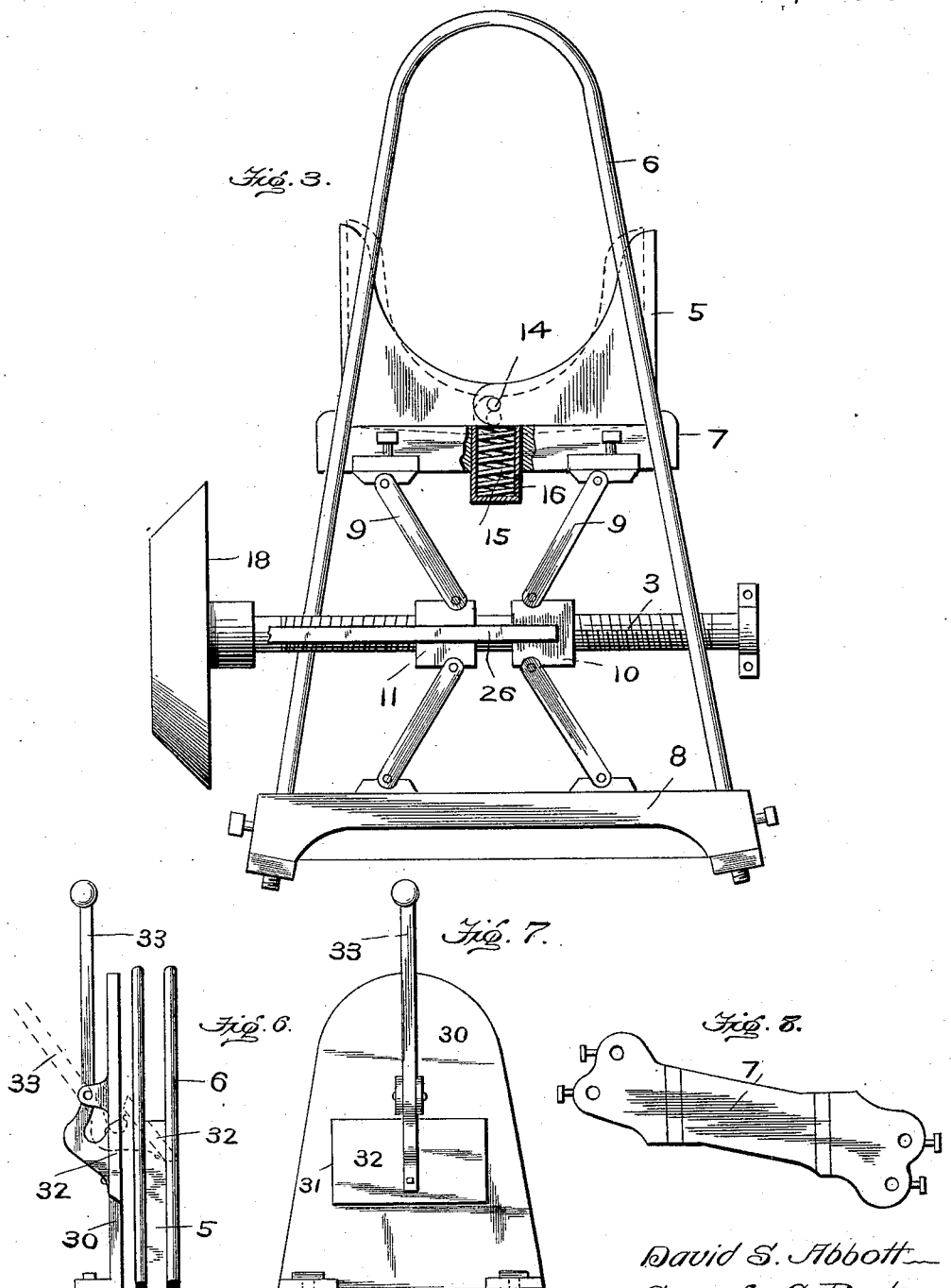

UNITED STATES PATENT OFFICE.

DAVID S. ABBOTT AND GEORGE G. PARKER, OF OLEAN, NEW YORK; SAID PARKER ASSIGNOR TO SAID ABBOTT.

MACHINE FOR BUNDLING KINDLING-WOOD.

SPECIFICATION forming part of Letters Patent No. 529,231, dated November 13, 1894.

Application filed September 1, 1893. Serial No. 484,572. (No model.)

*To all whom it may concern:*

Be it known that we, DAVID S. ABBOTT and GEORGE G. PARKER, citizens of the United States, residing at Olean, in the county of Cattaraugus and State of New York, have invented certain new and useful Improvements in Machines for Bundling Kindling-Wood; and we do hereby declare the following to be a full, clear, and exact description of the invention, such as will enable others skilled in the art to which it appertains to make and use the same.

In bundling kindling wood, it is customary to saw or cut the wood into sticks about three inches (3″) long and one and a half inches (1½″) in diameter, or thereabout, preparatory to assembling the sticks and tying them into a bundle suitable for the market; and by the present invention we aim to produce a machine by which the operations of assembling the sticks or pieces and compressing the same into a compact bundle can be easily and expeditiously performed.

The first part of our machine consists in the means for compacting the sticks, after they have been assembled, into a compact firm bundle suitable for tying, and the improved mechanism which we employ consists of a jaw and bow which are movable positively toward and from each other by reversible power mechanism to effect, first, the compression of the assembled sticks into a bundle, and, secondly, to release the bundle, after it has been tied, and thereby enabling the same to be ejected from the machine.

The bow is arranged over the jaw, and two cross-heads are provided which sustain the bow and jaw respectively and which are moved simultaneously in opposite directions by a power mechanism, consisting, of a shaft having right and left hand threads thereon, two follower nuts fitted on the respective threaded parts of the shaft, and links connected to the follower nuts and cross heads and forming toggle joints adapted, when straightened, to force the jaw and bow together through the medium of their cross heads, for compressing the bundle, and to move the jaw and bow away from each other as the follower nuts are brought closer together by the threaded shaft and the links are inclined, to release the bundle, which is tied by hand previous to its release from the jaw and bow.

We also provide mechanism under the control of the operator for reversing the screw shaft so that it can be run in either direction to move the jaw and bow toward or from each other, and this reversing mechanism contemplates a power shaft at right angles to the screw shaft and provided with two fixed bevel wheels which are situated on opposite sides of a single bevel wheel on the screw shaft, a lever connected to a movable bearing in which one end of the screw shaft is journaled, and a manual treadle or treadles connected to said lever for moving the same back and forth to cause the screw shaft to be adjusted one way or the other so that its bevel wheel will engage with one wheel on the power shaft when the bow and jaw are to be moved together while said bevel wheel on the screw shaft is adjusted to engage with the other bevel wheel on the power shaft when the bow and jaw are to be separated to release the bundle.

We have also devised mechanism for automatically throwing the screw shaft out of gear with the power shaft when the bow and jaw have reached their limits of movement either toward or from each other, and to this end we provide the follower nuts with detents which are fast to and movable with, said nuts and provided with studs or lugs that are adapted to strike fixed abutments situated in the path of the lugs, whereby, as the follower-nuts are separated by the rotation of the screw shaft in one direction to close the jaw and bow, one detent contacts with its abutment to move the screw shaft and its movable bearing laterally to bring its bevel wheel to a neutral position between the bevel wheels on the power shaft, to automatically throw the screw shaft out of gear with the power shaft, and the same result is accomplished by the other detent when the bow and jaw are separated as the screw shaft is rotated in the opposite direction to bring the follower nuts together.

It is highly desirable to dispose the bow and jaw relatively to the table of the machine in a convenient position for the attendant to easily and quickly place the sticks between said parts, and to accomplish this end we arrange the jaw, bow, and their cross heads diagonally to lines drawn through the table and the screw shaft. As the driving pulley and screw shaft are necessarily at right angles to the line of the screw shaft to adapt the driving belt to properly run around said pulley on the power shaft, and as the cross heads lie diagonally to the line of the table and screw shaft, for the purposes specified, it is desirable to so arrange and connect the toggle joint and lower cross head as to avoid any twisting strain on the latter and enable the employment of a comparatively light weight cross head. This is effected by making the toggle joints of substantially the same width as the cross head, and by pivotally connecting the links forming the toggle to the cross head at points close to the points of attachment of the bows.

To provide for the release of the bundle from the jaw after the bow has been moved away from the same, and to prevent the bundle from adhering or remaining tightly fixed between the sides of the jaw, we make the latter in sections which are pivotally connected at their inner ends to the upper cross head, and provide a strong coiled spring which is arranged to force the jaws away from the bundle as the latter is released from the vertically movable bow.

The invention finally consists in the combination of devices and peculiar construction and arrangement of parts as will be hereinafter more fully described and pointed out in the claims.

We will now proceed to a detailed description of the preferred embodiment of our invention shown in the accompanying drawings, forming a part of this specification, and in which—

Figure 2:
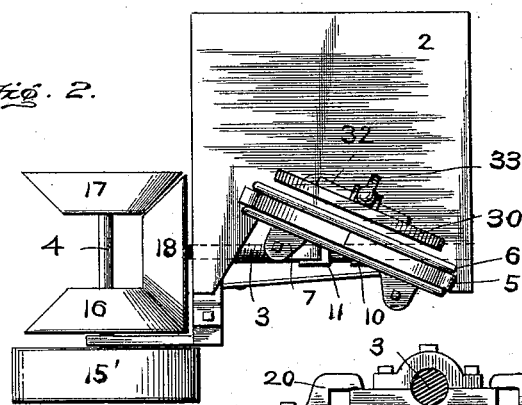
Figure 4:
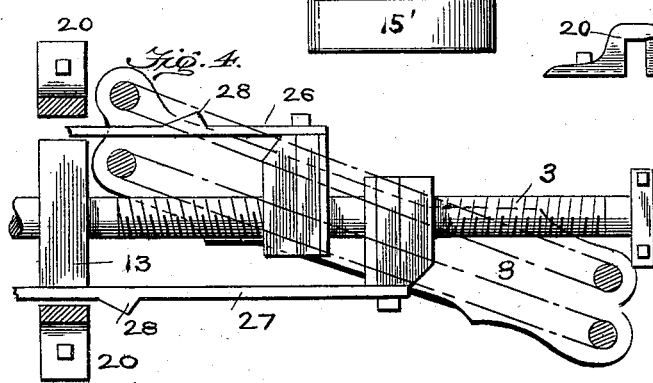
Figure 5:
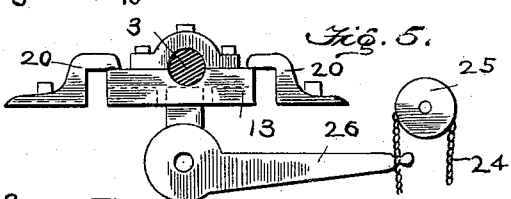

Figure 1 is a front elevation of our bundling machine. Fig. 2 is a top plan view thereof. Fig. 3 is an enlarged detail view of the coacting jaw and bow. Figs. 4 and 5 are detail views of the power mechanism showing the means employed for automatically throwing the screw shaft out of gear with the power shaft and the sliding bearing and treadle mechanism for adjusting the screw shaft, respectively. Figs. 6 and 7 are detail views, in side and edge view, respectively, of the assembling board and the ejector. Fig. 8 is a detail view, in plan, of one of the cross-heads.

Like numerals of reference denote corresponding parts in all the figures of the drawings, referring to which—

1 denotes the frame which sustains the horizontal flat table 2, the screw shaft, 3, the power shaft, 4, and the various operating parts of the machine. This table 2 is fixed in any suitable way to the top part of the frame 1, and at one side of the table are placed the sectional jaw 5 and the bow 6 which are carried by the cross heads 7, 8, respectively. These cross heads 7, 8, are arranged one below the other, and on opposite sides of the screw shaft 3, and they are sustained and operated by the toggle-joints 9, the follower nuts 10, 11, and the screw shaft 3. One end of this screw shaft 3 is journaled so as to rotate freely in a bearing 12, and the other end of this shaft 3 is likewise journaled in a sliding or movable bearing 13 so that the screw shaft is capable of a limited sidewise play for the purpose of throwing its bevel wheel into and out of engagement with the driving wheels on the power shaft 4, as will more fully appear hereinafter.

The screw shaft 3 is provided along a certain portion of its length with right hand screw threads, and it further has a left hand thread along another portion of its length. The follower nuts 10, 11, are provided with internal or female threads adapted to the right and left hand threads on the screw shaft, and as the shaft 3 is driven in one direction the nuts 10, 11, are caused to traverse said shaft toward each other but they are separated as the shaft is rotated in the reverse direction.

The members of the toggle joint are made substantially equal in width to the cross heads 7, 8, and said members of the toggle joint are pivotally connected at their inner approximate ends to the follower nuts and at their outer ends to the cross heads.

The bow 6 is preferably made in two sections of stout metal rods which are bent into the curved form shown and arranged parallel with each other, to afford the necessary area in cross section to press upon the assembled sticks, and these sections are securely fastened at their lower extremities to the ends of the lower cross head, close to the pivotal connection of the lower members of the toggle joint to said lower cross head. These bows extend upward past the screw shaft and the upper cross head 7 to a suitable distance above the table, and said bows are guided in suitable recesses or guides provided at or near the corners of the upper cross head. The jaw 5 is made in the form shown by Fig. 3 with its segmental side uppermost or facing toward the curved upper part of the bow, and said jaw is fitted between the members of the bow, which are spaced to accommodate the jaw, as shown. This jaw, 5, has its side edges constructed to fit between the members of the bow in such a manner as to permit the members of the jaw to have a limited movement or play and to be guided by and retained between the parallel parts of the bow; and said jaw, 5, is divided vertically at its middle to provide two members which have their inner, approximate ends pivoted together, at 14.

Against the pivoted ends of the members of the jaw normally presses a strong coiled spring, 15, which is contained within a suitable housing 16, rigidly secured to the lower side of the upper cross-head, said spring serving to normally raise the inner pivoted ends of the members of the jaw and thus force the outer larger ends of the members away from each other to the extent permitted by the bow, as indicated by full lines in the drawings; but this spring is designed to yield, when pressure is brought upon the bundle, to enable the members of the jaws to have a limited movement relative to each other, as shown by dotted lines in Fig. 3, whereby when the jaw and bow are released from the bundle after compressing the same, the spring throws the sections of the jaw away from the bundle to prevent the latter from adhering tightly between the jaw members and enable its ready removal from the machine by the action of the ejector.

The power shaft 4 stands at right angles to the screw shaft and is journaled in suitable bearings in the frame 1 at one side of the table, and on this shaft are fixed the driving pulley 15 and the two bevel wheels 16, 17, which are arranged in reverse positions on and are rigidly fixed to the power shaft at a suitable distance from each other to permit the necessary play between them of the bevel wheel 18 on the screw shaft. This bevel wheel 18 is fixed to the movable end of the screw shaft and arranged between the oppositely facing bevel wheels 16, 17, so as to remain out of contact with either wheel and thus allow the screw shaft to remain stationary, or to be moved by the shaft 3 into contact with either bevel wheel to rotate said screw shaft positively in one direction or the other.

The bearing 12 for one end of the screw shaft may be fixed to the frame and said shaft so mounted in said bearing to insure its lateral play, or the bearing 12 may be so mounted on the frame as to permit of its movement to accommodate the adjustment of the screw shaft. The other bearing 13 of the screw shaft is confined between guides 20, which are fixed to the frame 1 and have flanges that prevent upward displacement of the bearing, said guides 20 being spaced apart a sufficient distance for the bearing and shaft to have the necessary play to adjust its bevel wheel 18 into contact with either bevel wheel 16, 17, or free from contact with both wheels.

To provide for the manual adjustment of the screw shaft and enable the machine to be started and stopped by the attendant, we provide the two treadles 21, 22, which are hung on a suitable spindle or a part of the frame 1, and to these treadles are connected the rods 23 which are fastened at their upper ends to a chain 24 which passes over a guide sheave 25 suitably journaled in the frame 1; and to this chain 24 is connected one end of a bell-crank lever 26, fulcrumed to the frame 1, and connected at its other end to the sliding bearing 13. Mechanism is also provided for automatically throwing the screw shaft out of gear with the power shaft as the bow and jaw reach the limits of their adjustment. To the follower nuts 10, 11, are rigidly fastened the detents 26, 27, which are in the form of straight bars arranged parallel with each other on opposite sides of the screw shaft, and these detent-bars are provided with studs or shoulders 28 situated at suitable distances from the fixed guides 20, for the screw shaft bearing 13, said guides being arranged in the path of the detent shoulders and serving as the abutments for said detents. As the screw shaft is rotated in one direction to move the cross heads and compress the bundle, the follower nuts 10, 11, are separated until the lug 28 on the detent 26 strikes the fixed abutment in its path and throws the shaft 3 and bearing 13 sidewise a sufficient distance to bring the bevel wheel 18 to a neutral position between the bevel wheels 16, 17, and, on the other hand, when the screw shaft is rotated in the opposite direction to separate the bow and jaw, the nuts are brought together until the shoulder on the other detent 27 strikes its abutment and in like manner deflects the screw shaft and its bearing to throw the bevel wheel thereon out of contact with the other bevel wheel on the driving shaft, whereby the machine is automatically stopped when the bow and jaw reach their limits of adjustment both when moved toward and away from each other.

The bow and jaw are arranged diagonally to a line drawn through the table 2 so that they occupy a position which enables the attendant to conveniently place the sticks between the jaw and bow; and the cross heads are similarly arranged relative to the table and the screw shaft as they carry the bow and jaw, the lower cross head having one end disposed on one side of the screw shaft and the other end thereof is on the opposite side of the screw head. By making the members of the toggle joint nearly or quite as wide as the cross head, and connecting the lower members to the lower cross head close to the points where the bow is fastened thereto, we avoid all twisting strain on the lower cross head which might arise due to its diagonal position to the line of the screw shaft and thereby enable the use of a comparatively light cross head.

At one side of the bow and jaw, is arranged an upright assembling board 30 which is fastened rigidly to the table 1 at a suitable distance from the bow so that the ends of the sticks can abut against the board when they are placed between the bow and jaw and enable them to be properly assembled as regards their length. In this upright assembling board is provided an opening 31, shown by Fig. 7, and in this opening is fitted an ejector plate 32. To this ejector plate is fastened one end of a hand lever 33, which is fulcrumed at an intermediate point of its length between fixed lugs 34 on the assembling board and the upper end of this lever is projected above the assembling board in convenient position for the operator to grasp and operate the same to throw the ejector plate against the bundle and force the latter out of the machine after it has been compressed, tied, and released from the bow and jaw.

This being the construction of our bundling machine, the operation is as follows: The bow and jaw being separated, and the screw shaft at rest between the driving wheels 16, 17, the operator places the sticks between the bow and jaw until the space is filled and the ends of the sticks abut against the assembling board. The operator now presses one of the treadles to move the screw shaft laterally until the bevel wheel 18 thereon impinges against one of the rotating bevel wheels on the power shaft, thus rotating the screw shaft in one direction to separate the follower nuts and straighten the toggle joints. The cross heads and the jaw and bow are thus moved toward each other to compress the sticks into a compact bundle until the detent 26 strikes its abutment and forces the shaft 3 laterally and its bevel gear out of engagement with the driving bevel wheel. The operator now ties or binds the bundle, and then presses the other treadle to move the screw shaft in the opposite direction and cause its bevel wheel to engage with the other bevel wheel on the driving shaft, to rotate the screw shaft in the reverse direction and cause the nuts to move the cross heads, and the bow and jaw, away from each other until the other detent strikes its abutment to throw the screw shaft out of gear with the power shaft. The coiled spring now separates the jaw members to free the bundle from between the sides of the members thereof, and the operator now moves the lever connected with the ejector to force the bundle out of the machine.

We are aware that changes in the form and proportion of parts and details of construction of the devices herein shown and described as an embodiment of our invention can be made without departing from the spirit or sacrificing the advantages thereof, and we therefore reserve the right to make such changes and alterations therein as fairly fall within the scope of the same.

Having thus fully described our invention, what we claim as new, and desire to secure by Letters Patent, is—

1. A machine for bundling kindling wood, comprising the upper and lower cross-heads, an upright bow rigid with the lower cross-head, a jaw situated within the bow and carried by the upper cross-head, a power shaft having spaced bevel gears, a horizontal, laterally-movable, screw-shaft between the upper and lower cross-heads and mounted in a sliding bearing, mechanism for moving said screw-shaft laterally to shift the bevel gear thereon into engagement with either of said bevel gears on the power shaft or to a neutral position between the same, the nuts fitted on said screw-shaft and the toggle joints connected to the nuts and the cross-heads, substantially as described.

2. In a machine for bundling kindling wood, the combination with a bow and jaw arranged relatively to each other to receive the work, of cross heads by which said bow and jaw are carried, the screw shaft mounted on a sliding bearing, the power shaft having the driving gears, follower nuts on said screw shaft and connected by toggle-joint with said cross heads, and detents carried by said follower-nuts and arranged to impinge against abutments in their path to automatically shift the screw shaft out of gear with either of the driving gears as the bow and jaw reach their limit of adjustment respectively to each other, substantially as described.

3. In a machine for bundling kindling wood, the combination of the cross heads, the bow carried by one cross head, the jaw carried by the other cross head, a screw shaft between said cross heads and journaled at one end in a sliding bearing confined between fixed guides, the follower nuts fitted on said screw shaft and carrying detents arranged to impinge against said guides, a toggle-joint connected with the follower nuts and cross heads, a power shaft having the driving gears between which is fitted a gear on the screw shaft, a bell-crank lever connected to said sliding bearing, the treadles, and a chain connected to said treadles and the bell crank lever, substantially as described.

4. In a machine for bundling kindling wood, the combination with the cross heads and a bow carried by one of said cross heads, of a sectional jaw carried by the other cross head, a spring for normally holding the members of said jaw away from each other and mechanism for actuating said cross heads, substantially as and for the purpose described 5. In a machine for bundling kindling wood, the upper cross head, the sectional curved jaw carried by said cross head and having its members pivotally connected together, and a spring normally bearing against said pivoted ends of the jaw members, combined with a lower cross head carrying a bow, and mechanism for actuating said cross heads, substantially as and for the purpose described 6. In a machine for bundling kindling wood the combination with a bow, of a sectional jointed jaw coacting with the bow, and mechanism for operating the bow and jaw, whereby the bundle is prevented from adhering to the jaw when the pressure on the bundle is released, substantially as and for the purpose described.

7. In a machine for bundling kindling wood the combination with cross-heads, a bow movable with one of said cross-heads, a sectional jaw carried by the other cross-head, means for normally holding the members of the jaw toward each other and permitting said members to have a limited movement away from each other under the pressure of the bundle thereon, and operating mechanism for the cross-head, substantially as and for the purposes described.

8. In a machine for bundling wood, the combination, with cross heads, of a bow movable with one of said cross-heads, a sectional jointed jaw carried by the other cross-head yielding pressure devices associated with said jaw to permit the members thereof to have limited movement with respect to each other under the pressure of the bundle thereon, and operating mechanism for the crosshead, substantially as and for the purposes described.

9. In a machine for bundling kindling wood, the combination with cross heads, of a bow movable with one of said cross heads, a jaw carried by the other cross head and constructed in sections adapted to yield under pressure of the bundle, means for moving the jaw-sections relative to each other as the pressure of the bundle is released, and mechanism for operating the cross-heads, substantially as and for the purposes described.

10. In a machine for bundling kindling wood, the combination with a power shaft, and a screw shaft, of the diagonal crossheads extending across said screw shaft on opposite sides of the same, the nuts fitted on the screw shaft, the links pivoted to said nuts and to the cross-heads, a bow attached to the lower cross-head, and a jaw carried by the upper cross head and arranged within the jaw to coact therewith, for the purposes described, substantially as set forth.

11. In a machine for bundling kindling wood, the combination with a table, a power shaft, and a screw shaft parallel to the table and at right angles to the power shaft, of the diagonal broad crossheads extending across said screw shaft, the links connected to the nuts and having the opposite broad ends pivoted firmly to crossheads near the ends of the latter, the upright bow fastened to the lower cross head close to the broad joints of the lower links, and a jaw carried by the upper cross head and arranged with the bow to coact therewith, substantially as and for the purposes described.

In testimony whereof we affix our signatures in presence of two witnesses.

DAVID S. ABBOTT.
GEORGE G. PARKER.

Witnesses:
J. P. JOHNSON,
E. F. HALLIDAY.